United States Patent [19]

Kosaka

[11] 4,079,412
[45] Mar. 14, 1978

[54] SIGNAL PROCESSING CIRCUIT IN A COLOR VIDEO SIGNAL RECORDING AND/OR REPRODUCING APPARATUS

[75] Inventor: Yositeru Kosaka, Kamakura, Japan

[73] Assignee: Victor Company of Japan, Limited, Yokohama, Japan

[21] Appl. No.: 762,261

[22] Filed: Jan. 25, 1977

[30] Foreign Application Priority Data

Jan. 30, 1976 Japan .................................. 51-8938
Jan. 30, 1976 Japan .................................. 51-8939

[51] Int. Cl.$^2$ ........................................... H04N 5/79
[52] U.S. Cl. ................................................... 358/8
[58] Field of Search ...................................... 358/4, 8

[56] References Cited

U.S. PATENT DOCUMENTS 4,010,490  3/1977  Ota .......................................... 358/4

Primary Examiner—Robert L. Richardson

[57] ABSTRACT

A signal processing circuit is used in a color video signal recording and/or reproducing apparatus. The frequency of an original carrier chrominance signal is separated from an input color video signal and is converted into a low frequency band and/or reconverted from the low frequency band, back into the original frequency band. Rotating heads record and/or reproduce a video signal, including the converted carrier chrominance signal, on and/or from parallel tracks on the recording medium. The signal processing circuit determines the timing of phase shifting for every successive horizontal scanning period in response to a horizontal synchronizing signal separated from the video signal. The direction of phase shifting is determined in response to a signal supplied responsive to every scanning period of the rotating heads. A signal of frequency 4fs and the timing of phase shifting cooperate for determining the direction of phase shifting, and for forming a signal having a frequency fs. The phase angle shifts by 90 degrees for every successive horizontal scanning period. The phase shifting direction is inverted alternately for every successive scanning period of the rotating heads. The formed signal, of frequency fs, is utilized for a frequency conversion signal to be supplied to the frequency conversion means.

7 Claims, 8 Drawing Figures

SIGNAL PROCESSING CIRCUIT IN A COLOR VIDEO SIGNAL RECORDING AND/OR REPRODUCING APPARATUS

BACKGROUND OF THE INVENTION

The present invention relates to a signal processing circuit for use in a color video signal recording and/or reproducing apparatus. The phase angle of a carrier chrominance signal is sequentially rotated or shifted by 90° for every horizontal scanning period. More particularly, the invention relates to a signal processing circuit for producing a signal for shifting the phase of the carrier chrominance signal, of the color video signal, by 90° in the recording and/or reproducing apparatus.

In a conventional video signal recording and reproducing system, the reproducing head simultaneously reproduces video signals recorded on mutually adjacent video tracks. As a consequence of a tracking error which occurs at the time of reproducing, beat disturbances arise in the reproduced picture. Accordingly, in order to prevent a generation of such beat disturbances, video tracks are recorded on a medium with unrecorded areas, called ∓guard bands" between them.

The beat disturbances decrease as the width of the guard bands increase. There is a poor efficiency of the recording medium. Therefore, from the standpoint of improving the utilization efficiency of a recording medium, it is desirable to either reduce or eliminate the guard bands.

Accordingly, a known system uses recordings and reproducing heads having an obliquely directed gap. Thus, it is possible to reproduce signals in a manner which prevents beat disturbances, even when the recording is made without guard bands. In this system, two heads have gaps with azimuths which are oppositely inclined, with respect to the perpendicular of the scanning direction followed by the heads, for example. These heads are used alternately to record video signals in contiguous tracks, without guard bands, on a recording medium. In the reproducing system, a track is reproduced without loss if the recording head has the same azimuth as the recording head had. However, the contiguous track is recorded by a head having an azimuth of opposite direction, and the reproducing loss is very great. As a result, almost no beat disturbance is caused by the contiguous track.

A system is capable of recording and reproducing color video signals with a relative narrow frequency band, when a color video signal is separated into a luminance signal and a carrier chrominance signal. The luminance signal is frequency modulated, and the carrier chrominance signal is frequency converted to a band which is lower than the frequency band of the frequency-modulated luminance signal. The resulting frequency-modulated luminance signal and frequency-converted carrier chrominance signal are multiplexed and recorded.

When this system is used with a recording system having azimuth heads, a high frequency band of the frequency-modulated luminance signal can be reproduced without a beat disturbance. However, with regard to a frequency-converted chrominance signal in a low frequency band, there is a small reproducing loss due to the azimuth. For this reason, there is a problem of preventing beat disturbances due to reproduction of contiguous tracks.

Accordingly, the above described problems are resolved in the United States patent application Ser. No. 731,935, entitled Color Video Signal Recording and/or Reproducing System. This color video signal recording system frequency modulates a luminance signal separated from an input color video signal. A first signal processing means converts the frequency of the carrier chrominance signal separated from the input color video signal. The conversion is to a band which is lower than the band of the frequency-modulated luminance signal. The carrier chrominance signal is processed to advance the phase thereof, by 90° for every successive horizontal scanning period, during a specific period. Thereafter, the phase lags by 90° for every successive horizontal scanning period, during a successive specific period. For recording, the frequency-modulated luminance signal and carrier chrominance signal are multiplexed, and recorded on a plurality of tracks which are mutually disposed in parallel on a recording medium. The recording is performed in such a manner that a carrier chrominance signal has a successive phase advancement by 90°. The phase of a carrier chrominance signal lags successively, by 90°, in side-by-side disposition on mutual adjacent tracks.

To reproduce a signal recorded by the above described recording system, the frequency-modulated luminance signal is demodulated after it is separated from the reproduced signal. A second signal processing means restores the carrier chrominance signal separated from the reproduced signal, into the original frequency band. The chrominance signal is phase shifted by 90° for every successive horizontal scanning period, to restore the original carrier chrominance signal. The output signal of the second signal processing means is delayed by one horizontal scanning period. The output signal of the second signal processing means is mixed with the output signal of the delay means. The demodulated luminance signal is mixed with the output carrier chrominance signal of the mixing means, to produce a reproduced color video signal.

In this recording and reproducing system, it is necessary to carry out signal processing so as to advance or delay the phase of the carrier chrominance signal by 90° for every horizontal scanning period. Accordingly, for this signal processing, a signal processing circuit is used for producing an output signal wherein the phase shifts sequentially by 90°.

However, if the accuracy of the phase shifting of this signal processing circuit is poor, accurate color reproduction cannot be accomplished. For this reason, it is necessary for the error of the 90° phase shift to be within ± 1°. Since the carrier chrominance signal is phase shifted by 90° for every one horizontal scanning period (hereinafter represented by 1H), the phase rotates through 360° (that is, returns to its original state) every 4H period. For this reason, if the phase shifting accuracy is poor, color stripes will be generated in the reproduced picture every 4H period.

More specifically, if the phase shifting accuracy is poor, the result will be the same as a phase modulation of the carrier chrominance signal. Moreover, the 4H period in terms of frequency is approximately 3.93 KHz. This frequency is outside the band (normally, 1 – 2 KHz) within which it is possible to remove color phase fluctuation by means of an automatic phase compensator (APC), of the type used in an ordinary recording and reproducing apparatus. Consequently, the phase fluctuation caused by this poor phase shifting accuracy cannot be removed by an APC circuit. For this reason, color stripes will appear in the reproduced picture. Since these color stripes are stationary, they tend to be conspicuous even when they are slight. Accordingly, a strict requisite is required for the phase shifting accuracy of the signal processing circuit.

If this is an analog signal processing circuit using inductances and capacitances, it is subject to drifting due to temperature variation and with the elapse of time. Thus, such a circuit cannot satisfy the accuracy requirement.

As an alternative, the signal processing circuit might use a digital data selector which produces a signal which is phase shifted in a digital manner. By this measure, it is possible to satisfy the above mentioned requirement for phase shifting accuracy. No problem is encountered if a high-speed TTL is used for this digital data selector. However, if a low-speed MOS IC is used for this digital data selector, deviations occur in the duration of a period of time extending from the application of a signal to the address input terminal until the content of the data input terminal appears at the output terminal. As a result, the phase shifting accuracy is poor, and color stripes appear every 4H period in the reproduced picture.

SUMMARY OF THE INVENTION

Accordingly, it is a general object of the present invention to provide a novel and useful signal processing circuit in which the above described problems have been solved, and which is suitable for use in the color video signal recording and/or reproducing system which we have previously proposed.

Another object of the invention is to provide a signal processing circuit of very high phase shifting accuracy which is capable of shifting the phase of a carrier chrominance signal when used in the above mentioned color video signal recording and/or reproducing system and does not cause color stripes to appear in the reproduced picture.

Still another object of the invention is to provide a signal processing circuit which comprises, essentially, a four-phase wave generator and a data selector, and is suitable for use in the above mentioned color video signal recording and/or reproducing system. The four phase wave is obtained by digital control, and is capable of producing a signal having a phase which is shifted with a highly stable phase shifting accuracy without requiring any adjustments.

A further object of the invention is to provide a signal processing circuit further comprising a bistable multivibrator connected to the output side of the above described data selector. Even when a low speed element is used for the data selector, jitter sometimes might occur as a result of deviations in the delay time of this low speed element; however, such jitter may be removed by a bistable multivibrator. Accordingly, high phase shifting accuracy can be attained.

Other objects and further features of the invention will be apparent from the following detailed description when read in conjunction with the accompanying drawings.

DETAILED DESCRIPTION

Figure 1:
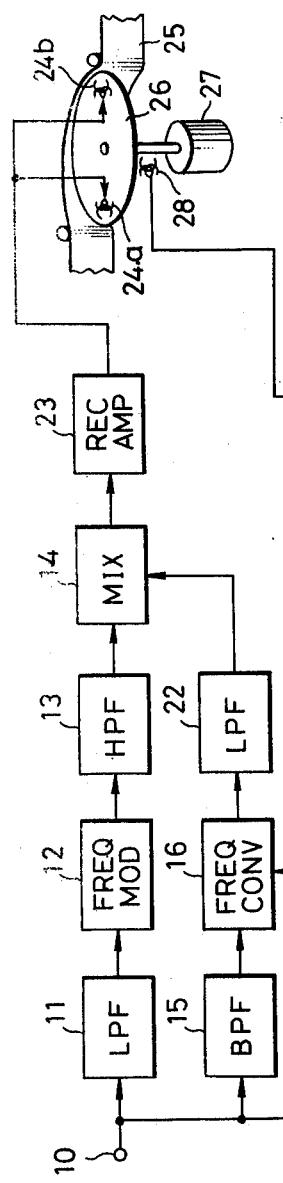
FIG. 1 is a block diagram of one exemplary recording system of a color video signal recording and reproducing system which I have previously designed, and which can be modified to contain a signal processing circuit, according to the present invention.

First to be described in the block diagram of an exemplary recording system and the reproducing system for a color video signal recording and reproducing system which I have previously designed. The signal processing circuit according to the invention can be applied to this system and will be described with reference to FIGS. 1 and 3.

A color video signal is applied to an input terminal 10. This signal is supplied, for example, to a low-pass filter 11 having an upper limit of filtering frequency of 3 MHz, a bandpass filter 15 having a filtering band of 3.1 to 4.1 MHz, and a horizontal synchronizing signal separation circuit 17. A luminance signal which has passed through the low-pass filter 11 is frequency modulated by a frequency modulator 12. The resulting output frequency-modulated signal has a frequency deviation band of 3.5 to 4.5 MHz. A high-pass filter 13, having a lower limit filtering frequency of 1.2 MHz, removes the unwanted component of this signal. Thereafter it is supplied to a mixer 14.

A carrier chrominance signal which has passed through the band-pass filter 15 is fed to a frequency converter 16, where it is frequency converted responsive to a signal supplied through a band-pass filter 21 from a frequency converter 20. The conversion is to a band which is lower than the band of the frequency-modulated luminance signal.

A horizontal synchronizing signal, which has been separated by the horizontal synchronizing signal separation circuit 17, is supplied to a signal processing circuit 18. For every vertical scanning period (every field period), a signal is derived from a detector 28 in synchronism with the rotation of a rotating structure 26 and supplied to the signal processing circuit 18. The signal processing circuit 18 produces as output a signal whose phase angle advances by 90 degrees for every horizontal scanning period in even number field periods (or odd number) and lags by 90 degrees in odd number (or even number) field periods respectively following thereafter, as described hereinafter.

The signal from the signal processing circuit 18 is frequency converted in the frequency converter 20 responsive to a signal from a reference oscillator 19.

The resulting output signal is supplied through a bandpass filter 21 to the frequency converter 16.

The carrier chrominance signal from the band-pass filter 15 is frequency converted in the frequency converter 16 responsive to a signal from the frequency converter 20. The converted frequency is formed into a signal whose phase angle successively advances by 90 degrees every 1H in one field period and successively lags by 90 degrees every 1H in the succeeding field period.

Hereinafter, the frequency of the color sub-carrier of the carrier chrominance signal which has passed through the band-pass filter 15 is denoted by "fc" (3.579545 MHz in a color video signal of the NTSC system). The frequency of the color sub-carrier of the carrier chrominance signal frequency converted in the frequency converter 16 is called "fs". The horizontal scanning frequency is called "$f_H$" (15.734264 KHz in the NTSC system). Here, frequency conversion is carried out in such the frequency converter 16 in a manner that the converted frequency fs of the color sub-carrier assumes the value given by the following equation:

$$fs = \tfrac{1}{2} f_H \cdot m$$

The resulting output signal of the frequency converter 16 is sent through a low-pass filter 22, where its unwanted component is removed. Thereafter, it is supplied to the mixer 14, where it is multiplexed with the frequency-modulated luminance signal. The resulting multiplexed signal is amplified in a recording amplifier 23 and then supplied to rotating heads 24a and 24b to be recorded for every alternate field on a traveling recording tape 25.

Figure 2:
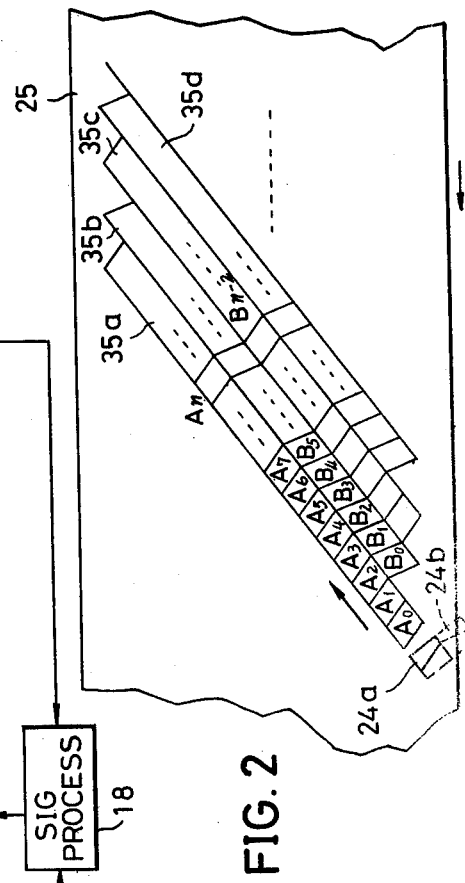
FIG. 2 is a fragmentary track pattern diagram of one part of a recording medium which has been recorded by the recording system illustrated in FIG. 1.

The rotating heads 24a and 24b are mounted on the rotating structure 26, at diametrically opposite positions. The rotating structure is driven in rotation by a motor 27. The rotating heads 24a and 24b have azimuth gaps which are inclined by at an angle of 6°, for example, in mutually opposite direction. The angle of inclination is measured from the perpendicular to the scanning direction of the heads, as indicated in FIG. 2. As also indicated in FIG. 2, the head 24a forms a track 35a during one field period. The head 24b forms a track 35b over the succeeding one field period. The two tracks 35a and 35b are in close contact with each other. Thereafter, in the same manner, tracks 35c, 35d, . . . are successively formed, alternately by the heads 24a and 24b.

For example, a signal whose phase is advanced by 90° during every successive horizontal scanning period, as indicated at Ao, A1, A2, . . . (FIG. 2), is recorded on the track 35a. On track 35b is recorded a signal whose phase lags by 90° during every successive horizontal scanning period, as indicated at Bo, B1, B2, . . . . These signals are recorded in contiguous tracks.

Then, An = An−1 <90° represents the relationship wherein the phase of the signal of the nth horizontal scanning period is advanced by 90°0 relative to the phase of the signal of the (n−1)th horizontal scanning period. Bn = Bn−1 < − 90° represents the relationship wherein the phase of the signal of the nth horizontal scanning period lags by 90° relative to the phase of the (n−1)th horizontal scanning period. The line correlation wherein the signal information of mutually adjacent horizontal scanning periods are closely alike, gives the following representation:

| | |
|---|---|
| A1 ÷ A0 ∠ 90°, | B1 ÷ B0 ∠ − 90° |
| A2 ÷ A1 ∠ 90°, | B2 ÷ B1 ∠ − 90° |
| A3 ÷ A2 ∠ 90°, | B3 ÷ B2 ∠ − 90° |
| ⋮ | ⋮ |
| An ÷ An−1 ∠ 90°, | Bn ÷ Bn−1 ∠ − 90° |

In magnetic recording and reproducing, in general, a moiré occurs when a symmetrical distortion is produced. Cross-modulation takes place between the frequency-modulated luminance signal and the frequency converted carrier chrominance signal. Within this moiré component, the largest frequency component is the frequency component 2fs which is twice the color sub-carrier frequency fs of the frequency converted carrier chrominance signal. Moreover, since this is a constant frequency, it is conspicuous.

The phase angles mutually differ by 90° for every pair of adjacent horizontal scanning periods on one and the same track. The phase of the color sub-carrier frequency fs of a first horizontal scanning period and the phase of the moiré frequency component 2fs of a horizontal scanning period adjacent to the first horizontal scanning period differ by twice 90°, that is, 180°. For this reason, the sub-carrier and moire frequency have a inverted phase relationship. Consequently, the moiré components are substantially nullified between the signals of mutually adjacent horizontal scanning periods. Therefore, the generation of a moiré is effectively prevented in the system of the present invention.

Figure 3:
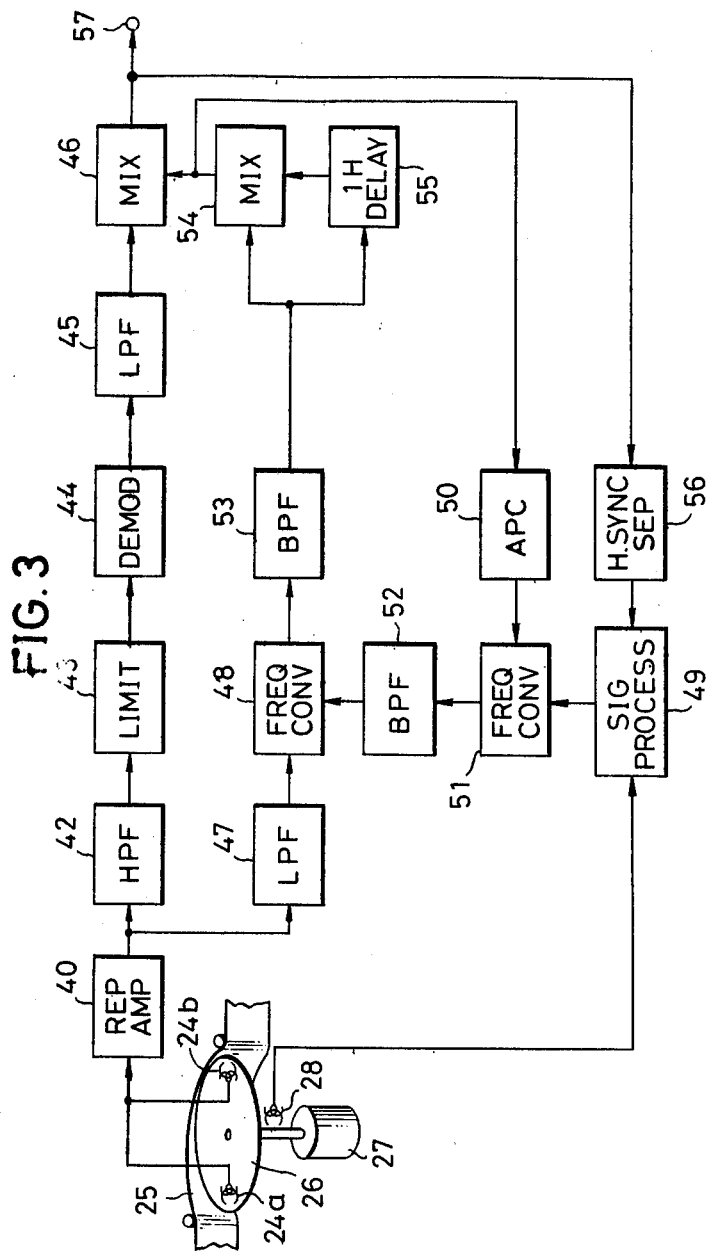
FIG. 3 is a block diagram of a reproducing system corresponding to the recording system shown in FIG. 1.

A system for reproducing a signal recorded in the above described manner on a recording tape will be described with reference to FIG. 3.

In this system, the signals recorded in the tracks on the tape 25 are alternately reproduced by the rotating heads 24a and 24b. For this operation, these rotating heads are controlled so that the head 24a scans the tracks 35a, 35c, . . . . The head 24b scans the tracks 35b, 35d, . . . . As is known, one control pulse may be recorded on the edge of the tape 25 for each revolution of the rotating structure 26. The control pulse is used to select the recording head.

The signals reproduced by the rotating heads 24a and 24b are mixed and amplified by a reproducing amplifier 40. Thereafter, the signal is supplied to a high-pass filter 42 having a lower-limit filtering frequency of 1.2 MHz and to a low-pass filter 47 having an upper-limit filtering frequency of 1.2 MHz. The frequency-modulated luminance signal, which has passed through the high-pass filter 42, is limited at a 43 and demodulated at 44. The demodulated luminance signal is sent through a low-pass filter 45, where its unwanted component is removed, and thereafter is supplied to a mixer 46.

The carrier chrominance signal which has passed through the low-pass filter 47 is supplied to a frequency converter 48. There it is frequency converted responsive to a signal supplied through a band-pass filter 52 from a frequency converter 51. The carrier chrominance signal is restored to its original frequency band.

Here, the color sub-carrier frequency fs of the frequency converted carrier chrominance signal is supplied to the frequency converter 48 and converted by a frequency $f_A$ from the frequency converter 51. The color sub-carrier frequency fs is restored to the original color sub-carrier frequency fc by deriving the difference frequency ($f_A - f_S$). Since the frequency conversion is carried out by taking a difference frequency, the phase of the carrier chrominance signal is inverted in the frequency converter 48. Consequently, the frequency conversion changes the signals reproduced from tracks 35a, 35c, . . . . into signals having phases which successively lag by 90°. (These signals are recorded with phases advanced by 90° for every successive horizontal scanning period.) Similarly, the signals reproduced from the tracks 35b, 35d, . . . . are changed into signals having phases which are successively advanced by 90°. (These signals are recorded with phases which lag by 90° for every successive horizontal scanning period.)

The output of the rotation detector 28 is supplied to a signal processing circuit 49. Furthermore, the horizontal synchronizing signals are separated from the output of the mixer 46 by a horizontal synchronizing signal separation circuit 56. The signals are also supplied to the signal processing circuit 49. The signal processing circuit 49 has the same circuit as the signal processing circuit 18 of the recording system. In an actual circuit, a single signal processing circuit is adapted to be used doubly, by switching, as the signal processing circuit 18 of the recording system and as the signal processing circuit 49 of the reproducing system. The signal processing circuit 49 produces as an output signal having a phase which successively lags (advances) by 90° with respect to a signal reproduced from recorded tracks 35a, 35c, . . . . The phase of signals in these tracks successively advance (lag) by 90°.

The frequency of the output signal of the signal processing circuit 49 is converted in a frequency converter 51 responsive to a signal from an APC circuit 50. The resulting output signal is supplied through the band-pass filter 52 to the frequency converter 48. The APC circuit 50 comprises a reference oscillator, a phase comparator for comparing the phases of the reference oscillator output and an output from a mixer 54. The frequency of the voltage-controlled oscillator is controlled in response to the output of the phase comparator.

The frequency and the phase of the carrier chrominance signal have been restored to their normal state by the frequency converter 48. The restored signal passes through a band-pass filter which removes unnecessary components. Then, it is supplied to the mixer 54 and to a one-horizontal-scanning-period (abbreviated 1H) delay line 55. The signal is delayed by one horizontal scaning period by the 1H delay line 55, before the mixer 54 mixes it with the signal supplied directly from the band-pass filter 53. The carrier chrominance output signal from the mixer 54 is supplied to the mixer 46 where it is mixed with the luminance signal to form a reproduced color video signal at output terminal 57.

The head 24a reproduces a signal A3 from the track 35a. For example, a signal A3 < 90° is produced as the output of the frequency converter 48 (where $\overline{A3}$ indicates that the signal has been phase inverted by the frequency conversion). Here, $\overline{A3} < 90° \div \overline{A2 < 90°} < 90° = A2 < -90° = A2$.

Accordingly, the head 24a reproduces a signal An. A signal $\overline{An} < 90° = An-1$ is produced as output from the frequency converter 48. Since there is line correlation, the information contents A'n and A'n−1 of the signals An and An−1 have the relationship A'n ÷ A'n−1. If the head 24a is reproducing the signal An, a signal An−2 is similarly produced as output from the 1H delay line 55. As a consequence, a signal (An=1 + An−2) is led out from the mixer 54. In terms of its information content, a signal A'n + A'n−1 ÷ 2A'n is obtained.

If there is a tracking error by the heads, and the head 24a reproduces both track 35a and track 35b, there is a problem of crosstalk, which will now be described.

It will be assumed, for example, that the head 24a has reproduced simultaneously the signal B1 of track 35b and the signal A3 of the track 35a. With respect to the signal of track 35a, a signal (A2 + A1) (2A'3 in terms of information content) is obtained from the mixer 54. The frequency converter 48 processes a similar signal with respect to the signal B1, which is reproduced at the same time. For this reason, a signal $\overline{B1} < 90°$ is obtained from the frequency converter 48.

Then, B1 < 90° = $\overline{Bo < -90°}$ < 90° = Bo < 90° < 90° = Bo < 180° = Bo < − 180°. Consequently, a signal Bo < − 180° and a signal Bo are respectively supplied, from frequency converter 48 and the 1H delay line 55, to the mixer 54. Then, Bo < − 180° + Bo = 0. Thus, the reproduced signals of the track 35b are mutually nullified in the mixer 54, and the resulting output becomes zero. Therefore, the crosstalk components from adjacent tracks are removed, and they do not appear in any manner in the resulting output.

If the head 24b simultaneously reproduces the track 35a or 35c while reproducing the track 35b, the crosstalk components are similarly removed in an effective manner.

Next to be described are embodiments of the signal processing circuit which are suitable for use as the signal processing circuit 18 (49) of the recording and reproducing system.

Figure 4:
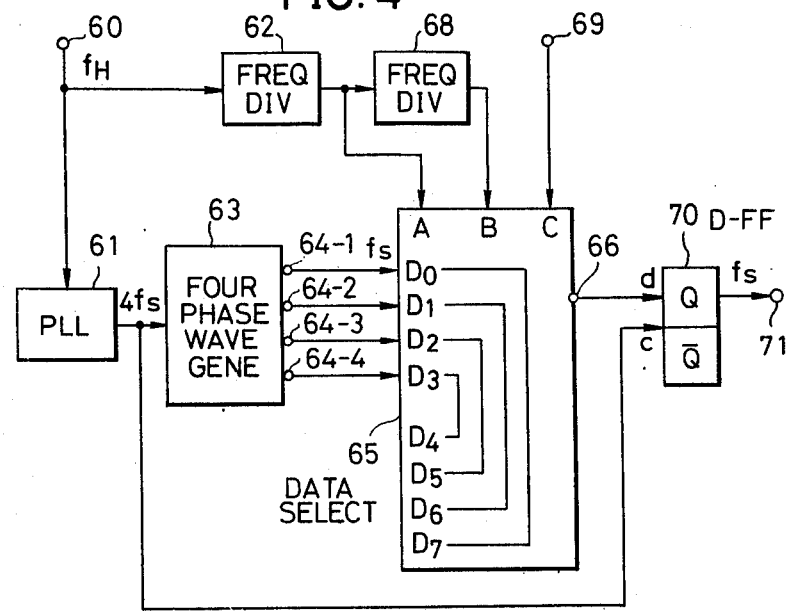
FIG. 4 is a block diagram showing one embodiment of the signal processing circuit according to the present invention, which is suitable for use in the recording and the reproducing systems illustrated in FIGS. 1 and 3.

In an embodiment shown in FIG. 4, a horizontal synchronizing signal is introduced from the horizontal synchronizing signal separator 17 (56) through a terminal 60 and is supplied to a phase locked loop (PLL) circuit 61 and a frequency divider 62. The horizontal synchronizing signal of a frequency $f_H$ is supplied to the PLL circuit 61 and there formed into a signal having a frequency corresponding to a frequency 4fs, which is four times the frequency fs of the chrominance sub-carrier, which has been frequency converted to the low frequency band. The output signal 4fs, of a voltage controlled oscillator of the PLL circuit 61, is supplied to a four phase wave generator 63 and to a clock input terminal c of a D-type bistable multivibrator or D-type flip-flop 70.

The four phase wave generator 63 produces outputs at its four output terminals 64-1, 64-2, 64-3, and 64-4, which outputs are rectangular wave forms of the frequency fs. The signals at these four terminals have phases differing respectively by 90 degrees. These output signals are supplied to the data input terminals D0, D1, D2, and D3 of an 8-line digital data selector 65, of a well known type. These input terminals D0 through D3 are respectively connected to the other input terminals D7, D6, D5, and D4 thereof.

On the other hand, the frequency of the horizontal synchronizing signal is divided in half by the frequency divider 62. The resulting output signal of a frequency ½ $f_H$ is inverted every 1H and applied to an address input terminal A of the data selector 65. Furthermore, the output signal of the frequency divider 62 is divided in half by a frequency divider 68. The resulting output signal of the frequency dividier 68 is a frequency ¼ $f_H$ which is inverted every 2H and applied to an address terminal B of the data selector 65. Furthermore, a pulse is inverted every field period and, supplied from the detector 28 through an input terminal 69 to an address input terminal C of the data selector 65.

The data selector 65 receives the input signals respectively at its data input terminals D0 through D3 and address input terminals A, B, and C. The output signals at terminal 66 are rectangular wave forms of a frequency fs, which are phase shifted by 90 degrees every 1H. There is an inversion of phase shifting (phase advance and lag) for every field period. These output signals are supplied to the input terminal d of flip-flop 70. The information (high level or low level) of the frequency fs is supplied to the input terminal d of the flip-flop 70. This information appears at the Q-output terminal responsive to every rise of the clock pulse applied to the terminal c, prior to the arrival of the clock pulse. This output is led out through an output terminal 71 and supplied to the frequency detector 20 (51).

The timing with of output appearing at the Q-output terminal of the flip-flop 70 is determined by the rises of the output signal of the frequency 4fs of the PLL circuit 61. Moreover, at every rise of this signal, the information of the data input terminal appears at the Q-output terminal. If a low speed data selector is used for the data selector 65, deviations tend to occur in the time interval (delay time) beteen the instant when a signal is applied to the address terminals A, B and C and the instant when a signal having the content of the data input terminal designated by the signal applied to the address terminal appears at the output terminal 66. Even in this case, an output signal having a rise time which coincides with the rise time of the signal of frequency 4fs (i.e., an output signal from which jitter due to these deviations in the delay time has been removed) is derived from the Q-output terminal of the flip-flop 70.

Figure 5:
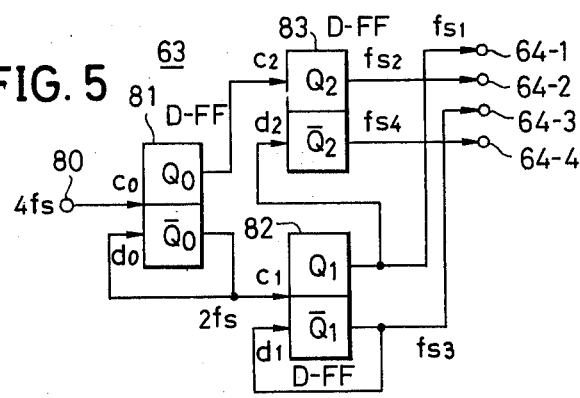
FIG. 5 is a schematic block diagram of one embodiment of a four phase wave generator in the signal processing circuit shown in FIG. 4.
Figure 6:
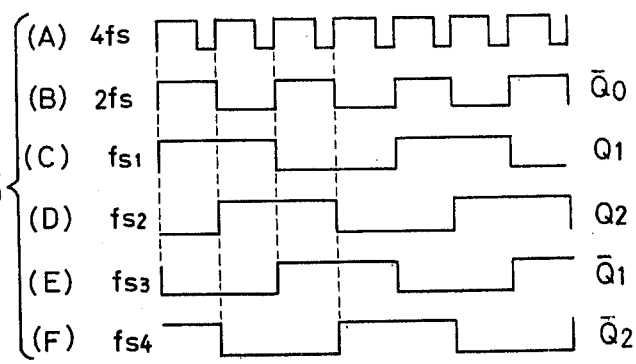
FIGS. 6(A) through 6(F) are signal waveforms for describing the operation of the four phase wave generator shown in FIG. 5.

Next to be described is a specific embodiment of the four phase wave generator 63 (FIG. 5). A signal of frequency 4fs has a waveform as indicated in FIG. 6(A). This signal is from the PLL 61 and is introduced into this circuit through an input terminal 80. It is applied to the clock input terminal $c_o$ of a D-type bistable multivibrator or a D-type flip-flop 81. This flip-flop 81 produces an output information (low level or high level) which is applied to the input terminal $d_o$, every time that the clock pulse applied to the terminal $c_o$ rises from low level to high level.

The Q-output signal of the flip-flop 81 is applied to a clock input terminal c2 of a D-type flip-flop 83. The $\bar{Q}_o$-output signal of this flip-flop 81 is applied to a clock input terminal c1 of a D-type flip-flop 82 and to an input terminal $d_o$ of the flip-flop 81. The $\bar{Q}_o$-output signal of the flip-flop 81 has a frequency of 2fs and a phase opposite to that of the $Q_o$-output signal with a waveform as indicated in FIG. 6(B). Accordingly, the flip-flops 82 and 83 respectively operate as toggle flip-flop. Their output signals are inverted at every rise of the input clock signal.

The Q1-output signal of the flip-flop 82 is a rectangular wave fs1 having a duty cycle of 50 percent, with a frequency fs, as indicated in FIG. 6(C). This output signal is applied to an input d2 of the flip-flop 83 and, at the same time, is led out through the output terminal 64-1. The $\bar{Q}$1-output signal of the flip-flop 82 is a rectangular wave fs3 having a phase opposite to the phase of the output signal fs1. Wave fs 3 has a duty cycle of 50 percent with a frequency fs, as indicated in FIG. 6(E). This output is applied to the input terminal of the flip-flop 82 and, at the same time, is led out through the output terminal 64-3.

The Q2-output signal of the flip-flop 83 is a signal having a waveform wherein the level of the input signal is maintained at the input terminal d2, at the instant of the rise of the clock input terminal c2, as indicated in FIG. 6(D). This Q2-output signal is a rectangular wave fs2 of a frequency fs which has a duty cycle of 50 percent. It differs in phase by 90 degrees from the phase of the rectangular waves fs1 and fs3, and is led out through the output terminal 64-2. The $\bar{Q}$2-output signal of the flip-flop 83, as indicated in FIG. 6(F), is of a phase opposite to the phase of the Q2-output signal fs2, and is led out as a rectangular wave fs4 through the output terminal 64-4.

Accordingly, the output terminals 64-1 through 64-4 of the four phase wave generator 63, have rectangular wave signals fs1 through fs4. The phases of these signals are staggered respectively by 90 degrees. They have a frequency fs and a duty cycle of 50 percent as indicated in FIGS. 6(C) through 6(F), and they are applied to the input terminals D0 through D3 of the data selector 65.

Figure 7:
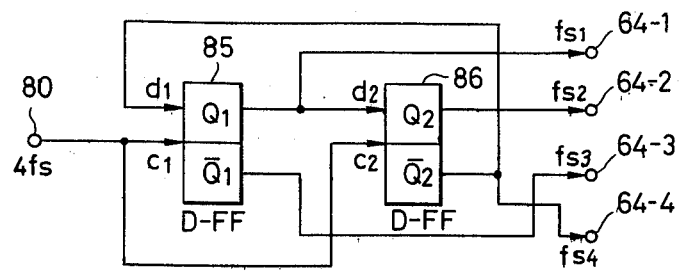
FIG. 7 is a block diagram of another embodiment of the four phase wave generator.

Another embodiment of the four phase wave generator 63 will now be described with reference to FIG. 7. A signal of frequency 4fs is introduced from the PLL 61 through the input terminal 80 and applied to a clock input terminal c1 of a D-type flip-flop 85 and to a clock input terminal c2 of a D-type flip-flop 86. The Q1-output signal of the flip-flop 85 is applied to an input terminal d2 of the flip-flop 86. It is also an output signal fs1 appearing at the output terminal 64-1. The $\bar{Q}$1-output signal has a phase opposite to the phase-of the Q1-output signal of the flip-flop 85. Signal this an output signal fs3 appearing at the output terminal 64-3. The Q2-output signal of the flip-flop 86 is an output signal fs2 appearing at the output terminal 64-2. The $\bar{Q}$2-output signal has a phase which is opposite to the phase of the Q2-output signal of the flip-flop 86 and is an output signal fs4 appearing at the output terminal 64-4. At the same time, it is also applied to an input terminal d1 of the flip-flop 85.

As described with respect to the embodiment of FIG. 5, in a D-type flip-flop, the information of the d input appears at the Q-output terminal at every rise of a clock pulse, prior to the arrival of the clock pulse. Accordingly, the sequence of the signals at the various output terminals is as set forth in the following table.

| $\bar{Q}$2(d1) | Q1(d2) | Q2 | $\bar{Q}$1 | $t = \frac{n}{4fs}$ |
|---|---|---|---|---|
| 0 | 0 | 1 | 1 | n = 0 |
| 1 | 0 | 0 | 1 | 1 |
| 1 | 1 | 0 | 0 | 2 |
| 0 | 1 | 1 | 0 | 3 |
| 0 | 0 | 1 | 1 | 4 |
| 1 | 0 | 0 | 1 | 5 |
| 1 | 1 | 0 | 0 | 6 |
| 0 | 1 | 1 | 0 | 7 |
| 0 | 0 | 1 | 1 | 8 |

In the above table, t denotes time which advances by one cycle of 4fs every time n increases by one (unity). As is apparent from the table, the frequency of the Q2-and Q1-output signals is fs. Since the phase returns to the original phase every time n advances by 4, this is equivalent to dividing 4fs by 4. Moreover, the phase of the Q2-output signal lags 90 degrees after the phase of the Q1-output signal. As a consequence, the output signals fs1 through fs4 at the output terminals 64-1 through 64-4 have phase relationships which are successively staggered by 90°, in the manner indicated in FIGS. 6(C) through 6(D).

In accordance with the instant embodiment of the invention, the four phase wave generator can be constituted by using two flip-flops, which is one less than the three flip-flops used in the four phase wave generator of the embodiment in FIG. 5. Thus, the circuit of the instant embodiment of the invention is simple.

Figure 8:
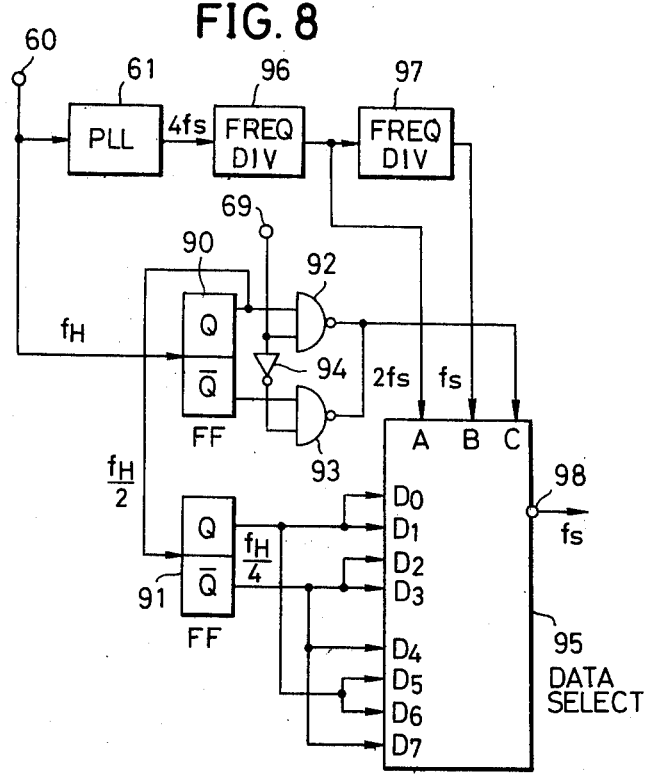
FIG. 8 is a block diagram of another embodiment of the signal processing circuit according to the invention.

Still another embodiment of the signal processing circuit according to the invention will now be described in conjunction with FIG. 8. The horizontal synchronizing signal of the frequency $f_H$ is introduced through the input terminal 60 and applied to a trigger flip-flop 90. Its output is inverted in accordance with the rise (or fall) of this signal. The output signal has a rectangular waveform of a frequency $\frac{1}{2}f_H$ and appears at the Q-output terminal of flip-flop 90. It is applied to one of the input terminals of a two-input NAND circuit 92 to trigger flip-flop 91. The output of this flip-flop 91 is inverted by the rise (or fall) of this applied signal. The rectangular wave output signal from the $\bar{Q}$-output terminal of the flip-flop 90 is applied to one of the input terminals of a two-input NAND circuit 93.

A pulse from the detector 28, which has arrived through the input terminal 69 is applied to the other input terminal of the NAND circuit 92. It is phase inverted in an inverter 94, and applied to the other input terminal of the NAND circuit 93. The outputs of the NAND circuits 92 and 93 are combined and formed into a rectangular wave which is inverted every 1H and applied to an address input terminal c1 of an 8-line digital data selector 95, of a well known type.

From the Q-output terminal and $\bar{Q}$-output terminal of the flip-flop 91, signals are obtained which are of mutually opposite phases and of frequency $f_H/4$, that is, are inverted every 2H. The Q-output signal of the flip-flop 91 is applied to the data input terminals D0, D1, D5, and D6 of the data selector 95. The $\bar{Q}$-output signal is applied to the input terminals D2, D3, D4, and D7 of the data selector 95.

The signal of the frequency 4fs from the PLL 61 is divided by 2 in a frequency divider 96, thereby forming a frequency of 2fs, which is applied to an address input terminal A of the data selector 95. The output signal of the frequency divider 96, is further frequency divided by 2 in a frequency divider 97, to become fs, which is applied to an address input terminal B of the data selector 95.

The resulting signal, of frequency fs, has a phase shifted by 90° every 1H. The phase shifting direction inverted every field period is and produced as an output at an output terminal 98 of the data selector 95. The produced signal is supplied to the frequency converter 20 (51).

Even in this embodiment, a data selector employs low speed elements and is used as the data selector 95. It is preferable to connnect a D-type flip-flop to the output of the data selector 95, as in the embodiment shown in FIG. 4. In this case, the output of the PLL 61 is supplied to a clock input terminal of the flip-flop as a clock pulse.

Further, this invention is not limited to these embodiments. Variations and modifications may be made without departing from the scope and spirit of the invention.

What is claimed is :

1. A signal processing circuit in a color video signal recording and/or reproducing apparatus, said recording and/or reproducing apparatus comprising: frequency conversion means for converting the frequency of a carrier chrominance signal into a low frequency band or for reconverting the frequency of the low frequency band back into the original carrier chrominance signal frequency band, and rotating heads for recording or reproducing a video signal including the converted carrier chrominance signal on or from parallel tracks on a recording medium, said signal processing circuit comprising: timing means for shifting the phase of a signal responsive to every successive horizontal synchronizing signal, means for fixing the direction of phase shifting in response to a signal supplied responsive to every scanning period of the rotating heads, means for forming a signal of a frequency 4fs, and means jointly responsive to the 4fs signal, to the timing means and to the fixing means for forming a signal having a frequency fs which is phase shifted by an angle of 90° for every successive horizontal scanning period, the phase shifting direction being inverted alternately for every successive scanning period of the rotating heads, said fs signal being utilized as a frequency conversion signal supplied to the frequency conversion means.

2. A signal processing circuit as claimed in claim 1, in which the frequency fs is equal to the frequency of a color sub-carrier of the carrier chrominance signal frequency converted to the low frequency band.

3. A signal processing circuit in a color video signal recording and/or reproducing apparatus, said recording and/or reproducing apparatus comprising:

frequency conversion means for converting the frequency of a carrier chrominance signal into a low frequency band or for reconverting the frequency of the low frequency band back into the original carrier chrominance signal frequency band, and rotating heads for recording or reproducing a video signal including the converted carrier chrominance signal on or from parallel tracks on a recording medium, said signal processing circuit comprising: means responsive to horizontal synchronizing signals separated from a video signal for forming a signal of frequency 4fs (fs being equal to the frequency of a color sub-carrier of the carrier chrominance signal frequency converted to the low frequency band), a four phase wave generator means responsive to a supplied signal of frequency 4fs for producing four signals each having a frequency fs with phases which are successively shifted by 90° with respect to each other, means for forming address signals from the horizontal synchronizing signal, and means for forming a signal having a frequency fs and a phase angle which is shifted by 90° for every successive horizontal scanning period, the phase shifting direction being inverted alternately for every successive scanning period of the rotating heads, said fs signal forming means having data input terminals supplied with the four signals from the four phase wave generator means and having address terminals supplied with the formed address signals and with a signal which is generated in response to every scanning period of the rotating heads, said frequency fs signal being a frequency conversion signal for controlling the frequency conversion means.

4. A signal processing circuit as claimed in claim 3, in which said four phase wave generator means comprises a first D-type flip-flop circuit having a clock input terminal supplied with the signal of frequency 4fs and a data input terminal supplied with a $\overline{Q}$-output of the first flip-flop circuit, a second D-type flip-flop circuit having a clock input terminal supplied with a $\overline{Q}$-output of the first flip-flop circuit and a data input terminal supplied with a $\overline{Q}$-output of the second flip-flop circuit, and a third D-type flip-flop circuit having a clock input terminal supplied with a Q-output of the first flip-flop circuit and a data input terminal supplied with a Q-output of the second flip-flop circuit, said four signals being derived from the Q-outputs and $\overline{Q}$-outputs of the second and third flip-flop circuits.

5. A signal processing circuit as claimed in claim 3, in which said four phase wave generator means comprises a first D-type flip-flop circuit having a clock terminal supplied with the signal 4fs, and a second D-type flip-flop circuit having a clock input terminal supplied with the signal 4fs and having a data input terminal supplied with a Q-output of the first flip-flop circuit, a $\overline{Q}$-output of the second flip-flop circuit being supplied with a data input terminal of the first flip-flop circuit, said four signals being derived from the Q-outputs and $\overline{Q}$-outputs of the first and second flip-flop circuits.

6. A signal processing circuit as claimed in claim 3 which further comprises a D-type flip-flop circuit having a data input terminal supplied with the signal fs and the shifting phase and having a clock input terminal supplied with the signal 4fs.

7. A signal processing circuit as claimed in claim 3, in which said frequency fs signal forming means is an eight-line digital data selector means having eight data input terminals, means for supplying the four signals from the four phase wave generator means to four of the eight data input terminals, the other four data input terminals being connected to the first group of four data input terminals, and said address signal forming means comprising frequency dividers for dividing the frequency $f_H$ of the horizontal synchronizing signal into the frequencies of $f_H/2$ and $f_H/4$.

* * * * *